(12) United States Patent
Seidel

(10) Patent No.: US 7,749,291 B2
(45) Date of Patent: Jul. 6, 2010

(54) THREE-STAGE GASIFICATION—BIOMASS-TO-ELECTRICITY PROCESS WITH AN ACETYLENE PROCESS

(75) Inventor: David Lee Seidel, Columbia, MO (US)

(73) Assignee: Seidel Research and Development Co, LLC, Columbia, MO (US)

( * ) Notice: Subject to any disclaimer, the term of this patent is extended or adjusted under 35 U.S.C. 154(b) by 215 days.

(21) Appl. No.: 11/744,974

(22) Filed: May 7, 2007

(65) Prior Publication Data
US 2008/0281133 A1    Nov. 13, 2008

(51) Int. Cl.
*C01B 31/30* (2006.01)
*C10G 1/00* (2006.01)

(52) U.S. Cl. .................. 48/197 R; 585/240; 585/242; 585/603; 423/439; 423/566.2; 423/418.2

(58) Field of Classification Search ............. 48/197 FM
See application file for complete search history.

(56) References Cited

U.S. PATENT DOCUMENTS

2002/0082458 A1*  6/2002  Peters et al. ................ 585/242

2005/0256212 A1*  11/2005  Norbeck et al. ............. 518/702

\* cited by examiner

*Primary Examiner*—Alexa D Neckel
*Assistant Examiner*—Imran Akram

(57) ABSTRACT

The invention relates to a process for the generation of electrical energy and byproducts from the gasification of biomass and/or environmental waste materials. Environmental waste and/or renewable biomass is processed by three separate stages of gasification. The first stage is a pyrolysis chamber with firebox which gasifies solid material into gaseous and liquid hydrocarbon compounds at temperatures below 800 F. The second stage is a fixed bed chamber gasifier which produces the acetylene and hydrogen gases at approximately 1400 F. The third stage is a high temperature reactor which produces molten calcium carbide at 3500 F. Various solid, liquid, and gaseous byproducts are produced along the way. The second stage gases include carbon monoxide, methane, hydrogen, acetylene and other biogases which are used to generate electricity in an internal combustion engine. The calcium carbide with water reaction generates acetylene gas and is used to enrich the gaseous fuel to the internal combustion engine or as a storable solid fuel. The energy generated from the partial combustion of the biomass/waste material is used to fuel the three gasification chambers. Air emissions tests shows ultra low pollution levels from this process.

5 Claims, 2 Drawing Sheets

THREE-STAGE GASIFICATION—BIOMASS-TO-ELECTRICITY PROCESS WITH AN ACETYLENE PROCESS

CROSS-REFERENCE OF RELATED APPLICATIONS

Provisional application No. 60/544,002

STATEMENT REGARDING FEDERALLY SPONSORED RESEARCH OR DEVELOPMENT

There was no federally sponsored research and development of this herein disclosed invention.

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates to processes and systems that use renewable biomass or carbon based waste material for the generation of power in the form of electricity or heat, for producing liquid, gaseous, and solid value-added byproducts, and reducing environmental pollution.

2. Description of the Related Art

The Applicant is well aware that quite extensive research, development, and experimentation has been recently developed to convert biomass or waste material into biogases and biofuels. Most of the prior art teaches of gasification using a fluidized bed chamber or a plasma arc chamber. The applicant is using three fixed bed chambers for separately controllable thermal chemical reactions to occur to form byproducts and biofuel for an adjoined internal combustion engine. Most of the related art uses the gasification heat to produce steam or syngas to operate turbines which generate electricity. The Applicant proposes a syngas enrichment process by producing acetylene gas from a direct gasification method and a molten calcium carbide with water method.

In general, the literature and art as known to the Applicant is unable to disclose a process suitable to produce high energy yield gases to operate internal combustion engines at a relatively low cost.

BRIEF SUMMARY OF THE INVENTION

The invention proposes a process which is unique in two ways. First, the process may convert any carboneous material, such as biocrops, animal waste, used tires, into bioproducts and biofuels. Secondly, the renewable biofuels in gas, liquid, or solid forms, produce electricity with a standard internal combustion engine with acetylene enrichment. The invention is a bioenergy and/or waste-to-energy process.

The carbon byproducts and the acetylene gaseous fuel for the internal combustion engine(s) are produces by three separate chambers of gasification of the carbon feedstock material. The feedstock is sorted, crushed, and/or screened and then pre-dried and/or stored before entering the first stage gasification chamber. The first stage gasification chamber is a fixed bed pyrolysis reactor which carbonizes the material at 300-1000 degrees F. The second stage gasification chamber is a partial combustion reactor which is controlled to around 1200-1400 degrees F. to produce acetylene, hydrogen and other C1-C4 biogases. The third stage gasification chamber is a complete combustion reactor which is fueled with the biogases and pure oxygen, and/or air and steam to rise the temperature to 3000 degrees F. or greater. The third stage chamber is equipped with a sealed flow tube in which charcoal and limestone or lime is melted to form molten calcium carbide. From condenser between the stages and the cooling the molten calcium carbide, carbon byproducts are formed such as charcoal, alcohols, acetone, ethanol, methanol, methane, hydrogen, acetylene, and calcium carbide. The reaction of calcium carbide and water at atmosphere temperature produces acetylene gas which may be used to enrich the low BTU gaseous biofuel and methanol into the internal combustion engine of the genset which produces electricity.

BRIEF DESCRIPTION OF THE SEVERAL VIEWS OF THE DRAWINGS

The present invention will become more clearly defined as the disclosure of the invention is made with reference to the accompanying drawings. In the Drawings.

DETAILED DESCRIPTION OF THE INVENTION

Figure 1:
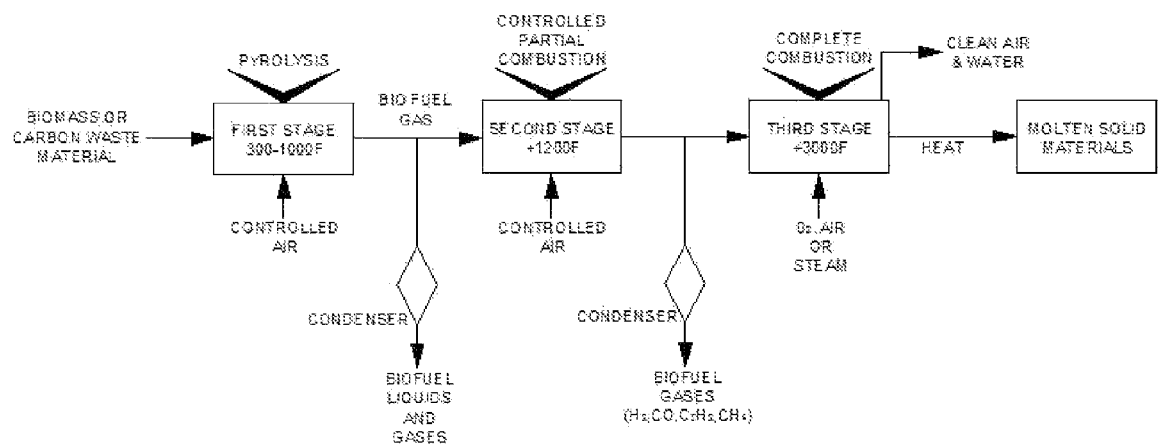
FIG. 1 is the general flow chart of the three stage gasification process and illustrates the main components of the prior to the power generation.
Figure 2:
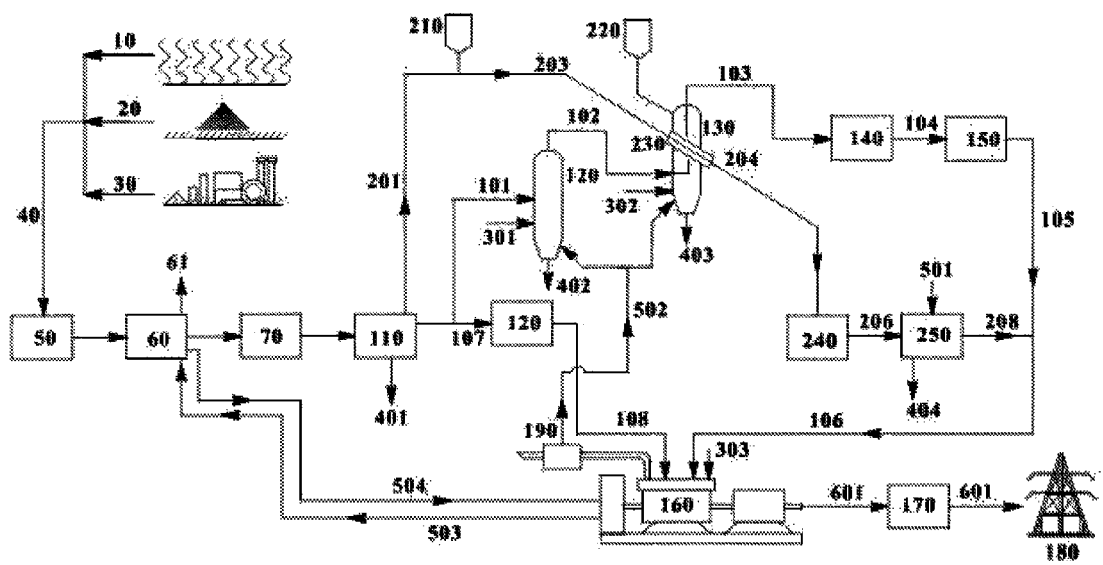
FIG. 2 show the process in more detail with the way the power generation unit is coupled to the fuel flow and the heat recovery flow patterns to make the process more thermally efficient as claimed herein.

A process and system for generating biopower and/or waste-to-energy power, producing solid, liquid, and gaseous carbon based byproducts using biomass or environmental wastes is described in detail herein with reference to FIGS. 1 and 2. The process has a potential impact on the agricultural, forestry, energy consumption, and the environment in the United States and the world.

The art of carbonization of biomass and carbon waste material such as wood waste has been well established in history. Using fixed bed and firebox contained chambers or kilns for gasification of wood to produce charcoal is the primary example for this art. Prior to the petroleum and chemical revolution, the gasification and condensation of this gaseous produced marketable gases, tars, liquid, and charcoal for the world. This process will bring back the old art of producing byproducts and generate electricity from acetylene plus low BTU biogases. Storable calcium carbide fuel is one of the most value added products as fuel cell energy.

In FIG. 1, a process flow diagram details the three stages of gasification process of this invention. After the biomass or carbon waste material has be classified and/or dried, the material is loading into the first stage gasification chamber. The chamber is designed to handle large volumes of biomass in large forms such as wood slabs or whole tires, etc. The material is placed on a fixed bed or grated system to allow air to pass through. A centrally located firebox is lit with dry flammable material of the same nature. With controlled air movement through the material in the chamber, the material is heated to between 300 and 1000 degrees F. for a period of time until all the material has carbonized and released it water and gases into the air exhaust steam. A small portion of the biofuel gas are condensed and the larger portion entered the second stage gasifier or combustor. The second stage chamber is a chamber that is designed to control the partial combustion of the biofuels to maintain 1200+ degree F. The chamber has a thermal mass energy storage bed within. The thermal mass stores the energy to maintain the desired temperature range.

The gases produced in this chamber are hydrogen, carbon monoxide, acetylene, methane ethane, and other C1-C4 gases. A portion of these gases are cooled or condensed and then used to fuel the internal combustion engine. The other portion goes into the third stage gasifier or combustor and is fired with pure oxygen or air and steam to rise the temperature to 3000+ degrees F. Complete combustion reactions occur to drive the temperature up and releases clean air and water into the atmosphere. The internal component to the third stage gasifier is the ceramic high-temperature gravity flow tube. The tube flows a mixture of lime or limestone and charcoal through the +3000 degree chamber zone, where molten calcium carbide is formed. The molten carbide is cooled and later releases acetylene gas when reacted with water. The acetylene enriched the biogases for the efficient operation of the internal combustion engine and generator to produce green electricity. The system is completely renewable and the calcium is recycled back into lime to be reused in the process again.

In FIG. 2, the process is completely detailed to show the components of the system. The process is most effective with a receipt of dry and wet materials. From the farmland biocrops 10 are grown. Agriculture waste material 20 such as brush, trees and waste hay and animal manures and industrial waste materials 30 may be collected. The materials are bulk delivered to the bioenergy conversion facility 40 where the material is classified 50, crushed, sorted, and sized. The material is drying to less than thirty percent moisture in a drier 60 in which hot water or steam heat is supplied 503 from the IC engine 160. After the material is dried it may be stored for a short time in a building 70, before being loaded into the first stage gasification chamber, 110 a pyrolysis gasifier. The gasifier releases the water, hydrocarbons, and carbon monoxide for the material and carbonizes the solid material matrix. A small amount of ash 401 may be generated from the burning of the dry firebox material. The charcoal or charred material is a sellable byproduct and a portion of the charred material 201 is mixed with lime or limestone which is stored in a silo 210. The mixture of calcium and carbon 203 is delivered to the third stage gasifier's flow tube 230 to be heated above 3000 degrees to form molten calcium carbide 204. A portion of the first stage biofuel gas 107 is cooled at condenser 115 and is a sellable byproduct or delivered 108 as liquid and gaseous biofuel to the IC engine 160. The second portion of the first stage biofuel gases 101 is delivered to the second stage gasifier 120. The air 301 and biogases 101 are ignited in the hot fixed bed of the gasifier and controlled to a temperature of 1200 degrees F. Extra heat 402 and 302 for the second 120 and third 130 stage gasifiers may be provided from the exhaust heat exchanger 190 or direct exhaust 502 from the IC engine 160. The partially combusted gases or cracked gases 102 are a sellable byproduct 102,103,104,105 such as hydrogen, acetylene, methane, and other C1-C4 hydrocarbons after cooling 140 and purification 150. If not sold, these hot gases 102 are delivered to the third stage gasifier or reactor 130 to be completely combusted with pure oxygen or steam/air 302 to drive the chamber temperature over 3000 degrees F. The dolomite from the silo 220 is injected into the third stage gasifier 130 to enrich the oxygen supply. Any ash or soot particles 402,403 are cleaned out of the gasifiers after shut down of the system. The molten calcium carbide 204 is caught, cooled, and/or crushed 240 to sellable or usable size. The portion of calcium carbide 206, which is to be used in the power generation, is feed into the acetylene generator 250 with water 501. The reaction occurs which generates acetylene gas 208 and a calcium hydroxide/water slurry 404. The water and calcium hydroxide are recycled by a heating and filtering unit. The enriched combustion gases 106 are delivered to the internal combustion engine 160 with air 303 at the engine intake manifold. The modified internal combustion engine and generator 160 produces electricity 601 for facility consumption and excess electricity 601 is sold as green power on the electric power grid network 180 at the meter and switchgear 170.

The process is self-sustainable after initial start up, if the feed material is supplied at a proper flow rate. Initial results, show that the process is vital in environmental waste cleanup efforts of animal manure and forest fire prevention and agricultural crop carbon sequencing. The environmental impact study shows a positive valued life cycle assessment with a host of carbon byproducts. Green power generation is made economical with tradable air pollution credits.

What is claimed is:

1. A three-stage gasification process with three separate thermal reaction chambers for producing solid, liquid, and gaseous fuels from biomass and carbonaceous environmental waste materials into electricity generated by an internal combustion engine, the process comprising:
    a. feeding by loading, conveying, or pneumatic transfer of feedstock comprising solid biomass and carbonaceous environmental waste materials into the first chamber of a series of three separate staging, negative pressure, non-catalyst, non-plasma, non-Fischer-Tropsch reaction chambers;
    b. gasifying the feedstock in a pyrolysis first-stage reaction chamber where solid materials is carbonized at a temperature of at least 300° F. to form solid carbonized products and gaseous exhaust;
    c. removing by loading, conveying, or pneumatic transfer of the solid carbonized products from the first chamber;
    d. delivering by piping an optional portion of the gaseous exhaust from the first-stage reaction chamber into a gas-to-liquid condenser and delivering by piping the remaining portion of the gaseous exhaust into the second-stage reaction chamber;
    e. condensing of the optional portion of gaseous exhaust in the condenser into liquid or gaseous biofuels;
    f. combusting the remaining portion of the gaseous exhaust with controlled oxygen feed in the second-stage reaction chamber wherein heavy hydrocarbon gases are converted into lighter hydrocarbon gases including hydrogen by partial combustion at a temperature of at least 1200° F.;
    g. cooling of a portion of the lighter hydrocarbons gases by passing the gases through a cooling exchanger;
    h. completely combusting the remaining portion of the lighter hydrocarbon gases with controlled oxygen feed in a third-stage reaction chamber at a temperature of at least 3800° F.;
    i. heat exchanging a mixture of the solid carbonized products and lime or limestone through a gravity flow tube in the third stage chamber, which melts the mixture into molten calcium carbide;
    j. cooling of the molten calcium carbide into solid form;
    k. releasing of acetylene gas by the reaction of a portion of calcium carbide with water for the fueling of the internal combustion engine for the generation of electricity or mechanical power;
    l. processing, storing, and packaging of any gas, liquids, and solid byproducts from the process; and
    m. storing remaining calcium carbide.

2. The process according to claim 1, wherein the solid, liquid, and gaseous byproducts include calcium carbide, methane, ethane, ethanol, methanol, ethylene, acetylene, hydrogen, alcohols, activated carbon and/or charcoal.

3. The process according to claim 1, wherein the byproducts are all usable to enhance the performance of the internal combustion engine in the process.

4. The process according to claim 3, wherein the acetylene produced from the calcium carbide/water reaction is used to enrich the byproducts entering the internal combustion engine.

5. The process according to claim 1, wherein the process is a self-sustainable process after start-up that utilizes its own internal thermal heat from the combustion reactions to maintain the temperatures in each of the three reaction chambers and piping.

\* \* \* \* \*